United States Patent [19]
Citta et al.

[11] Patent Number: 5,534,938
[45] Date of Patent: Jul. 9, 1996

[54] DIGITAL TV SYSTEM USING SEGMENT AND FIELD SYNC SIGNALS

[76] Inventors: Richard W. Citta, 739 N. Columbian, Oak Park, Ill. 60302; Gary J. Sgrignoli, 1139 Juniper La., Mount Prospect, Ill. 60056; Rudolf Turner, 11 Winding Branch Rd., Hawthorn Woods, Ill. 60047

[21] Appl. No.: 324,054

[22] Filed: Oct. 17, 1994

Related U.S. Application Data

[63] Continuation of Ser. No. 204,972, Mar. 2, 1994, which is a continuation-in-part of Ser. No. 894,406, Jun. 5, 1992, abandoned, which is a continuation-in-part of Ser. No. 732,368, Jul. 18, 1991, abandoned.

[51] Int. Cl.⁶ .............................. H04N 7/00; H04N 5/04
[52] U.S. Cl. ..................... 348/495; 348/471; 375/286
[58] Field of Search ................................. 358/86, 13, 141; 340/471, 472; 375/17–20, 113–116, 286, 365, 364; 348/495, 471, 500; H04N 7/13

[56] References Cited

U.S. PATENT DOCUMENTS 5,060,067  10/1991  Lee et al. ................................ 358/167

FOREIGN PATENT DOCUMENTS 0015388  1/1984  Japan ....................................... 358/86

*Primary Examiner*—David E. Harvey

[57] ABSTRACT

A digital data transmission system includes data signals formatted in successive fields consisting of blocks of video symbols in repetitive data segments with each data segment including a synchronizing signal character for providing data segment sync. The first data segment in each field includes a field timing signal that provides field sync. The digital data is in the form of M-level symbols and the sync information (both data segment and field) is in the form of N-level symbols, where M is greater than N.

26 Claims, 3 Drawing Sheets

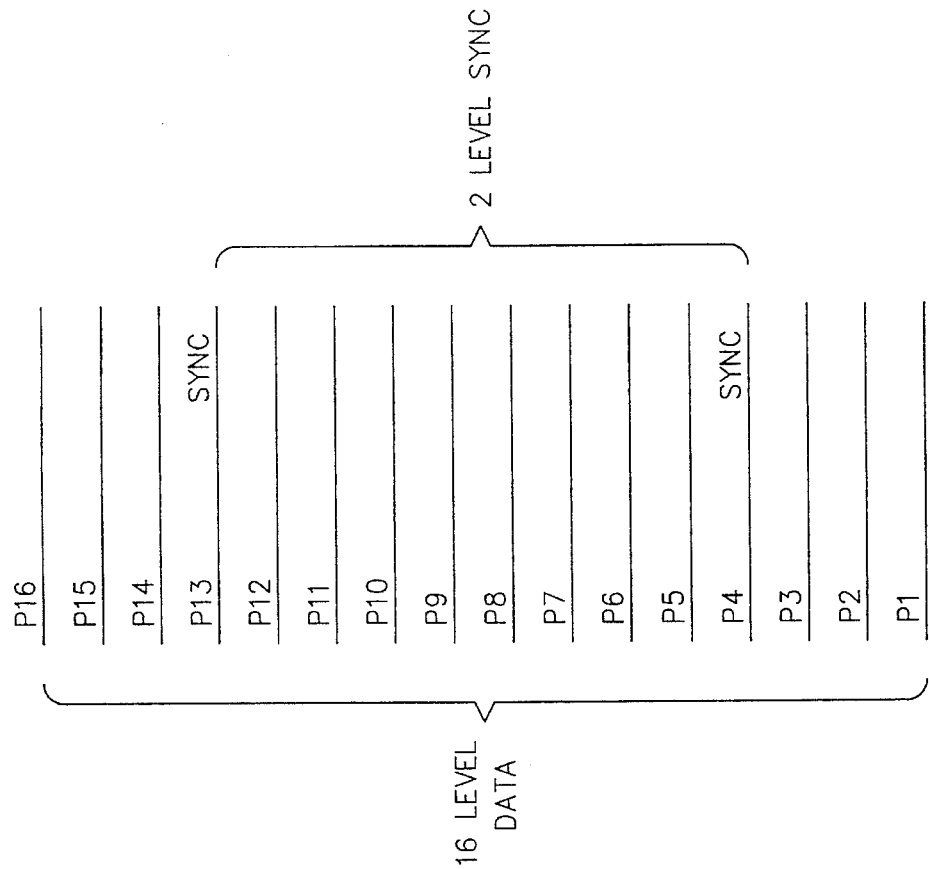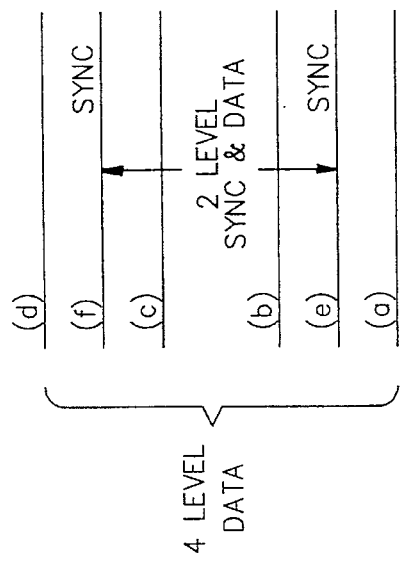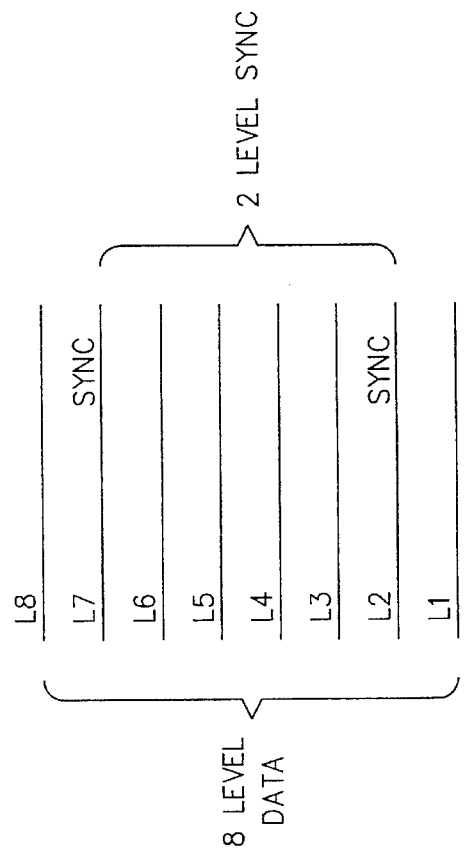

DIGITAL TV SYSTEM USING SEGMENT AND FIELD SYNC SIGNALS

CROSS REFERENCE TO RELATED PATENT APPLICATIONS

This application is a continuation of Ser. No. 08/204,972, filed Mar. 2, 1994, which is a continuation-in-part of Ser. No. 894,406, filed Jun. 5, 1992, now abandoned which is a continuation-in-part of Ser. No. 732,368, filed Jul. 18, 1991, (now abandoned) and is related to the inventions described and claimed in U.S. Pat. No. 5,086,340; application Ser. No. 894,388, filed Jul. 5, 1992, (now U.S. Pat. No. 5,416,524) which is a continuation-in-part of Ser. No. 763,848, filed Sep. 23, 1992, (now abandoned) which is a continuation-in-part of Ser. No. 732,369, filed Jul. 18, 1991, (now abandoned) and application Ser. No. 893,486, filed Jun. 5, 1992, (now U.S. Pat. No. 5,260,793 which is a continuation-in-part of Ser. No. 732,387, filed Jul. 7, 1991 (now abandoned), all of which are assigned to Zenith Electronics Corporation.

BACKGROUND OF THE INVENTION

This invention relates generally to a high definition television (HDTV) system and specifically to a digital spectrum compatible (DSC) HDTV system.

Zenith Electronics Corporation, which previously announced its spectrum compatible high definition television system, recently announced its digital implementation thereof, which is called DSC-HDTV. In this system, encoded video data is formatted in a transmission frame having a plurality of successive data segments, each comprising a series of multi-level data symbols, including a predetermined data segment sync character. The data segment sync character, which establishes the timing of the data segments, is selected such that it produces a zero or reference level between higher and lower levels at three successive sampling points in the received television signal. The repetitive nature of the data segments and their timing enables ready detection of the data segment sync characters without requiring an excessive amount of data space in each data segment. That invention is described and claimed in copending application Ser. No. 894,388 above.

As fully described in U.S. Pat. No. 5,086,340, referred to above, HDTV receivers preferably employ special linear filters for minimizing the effects of NTSC co-channel signals. The linear filter has null points or notches that correspond to the NTSC signal frequencies that have the greatest interference-causing potential and a notch at DC, which has a benefit in that any direct current components acquired by the signal are precluded from the receiver. Thus, the benefits of the linear filter in the receiver are the rejection of NTSC signal interference and DC rejection. The disadvantages are a 3dB signal-to-noise (S/N) loss and some corruption of the data. To preserve the data, it is modulo N precoded in the transmitter. The receiver must therefore incorporate suitable postcoding circuitry to reconvert the data. Modulo N precoding may be accomplished by a modulo N adder and a delay circuit in a feedback arrangement and/or by other suitable circuitry. An N level input signal thus yields an N level output signal.

The N level input to a linear filter, consisting of an algebraic adder and a delay circuit in a feed forward configuration, results in a greater than N level output signal. The number of levels is dependent upon the number of feed forward taps on the delay unit. For a single tap delay, the output is given by the formula 2N−1. The linear filter must be followed by an appropriate "slicer" to yield the correct N level data signals.

Where there is no significant NTSC co-channel interference, the linear filter 3dB S/N loss may be avoided by processing the precoded modulo N signal through a suitable modulo N postcoder in the receiver to again produce the original N level data signal. It should be apparent that in a benign environment, or one that is devoid of NTSC co-channel interference, such as a cable system, the linear filter is not used.

The transmission system is useful for both terrestrial broadcasting (as described above) and for cable systems. As mentioned, the relatively benign environment of a cable system obviates the need for the linear filter since no NTSC co-channel is experienced and the transmission medium is generally much less noisy. Therefore a data constellation having a greater number of levels (i.e. larger N) may be used for a greater data rate. The principles however are the same.

The transmission frame preferably also includes selected field sync signals. In one embodiment, the field sync or timing signals are 2 level symbols and the data is, for example, in multilevel symbol form, e.g. either 2, 4, 8 or 16 level VSB (vestigial sideband) symbols. The levels of the 2 level symbols may comprise a subset of the multilevel symbols. Thus, if four levels (a), (b), (c) and (d) are used, levels (a) and (c) may be used for 2 level data, all four levels (a), (b), (c), (d) may be used for 4 level data and the two outermost levels (a) and (d) used for the 2 levels of the sync information or timing signals. Such an arrangement yields a robust sync signal, which is highly desirable. As will be seen, the S/N loss introduced by the linear filter in the receiver is acceptable with the more robust 2 outer level sync signal. The interference rejection of the linear filter enables the receiver to stay locked even under very weak and noisy signal conditions.

In another embodiment, the levels of the 2 level data and the synchronizing information may be between or intermediate the two upper and two lower levels of the 4 level data, i.e. between levels (a) and (b) and between levels (c) and (d). In the copending application Ser. No. 894,388 the level intermediate levels (a) and (b) is referred to as level (e) and the level intermediate levels (c) and (d) is referred to as level (f). Thus there are in reality six distinct levels. While the sync in this embodiment is not as robust as sync symbols having the 2 outer levels (a) and (d), the arrangement provides an average pilot which is equal for both 2 level and 4 level data and causes less interference into an NTSC co-channel.

The presently preferred embodiment for terrestrial broadcasting is an 8 level VSB transmission system, whereas for cable systems, the data may be transmitted as 16, 8, 4 or 2 level symbols, depending upon the noise characterizing the system. In a proper environment, 24 level data symbols are quite feasible for an even higher data rate. In the terrestrial transmission embodiment, the 2 level sync symbols preferably comprise levels L2 and L7 (FIG. 3) of the 8 level data symbols, and in the cable transmission systems, the 2 level sync symbols preferably comprise levels P4 and P13 (FIG. 4) of the 16 level data symbols. It will be appreciated that other levels for the sync may be selected within the teachings of the invention.

The invention in copending application Ser. No. 893,486 provides for the selection of alternate signal processing paths in the receiver, for minimizing the S/N loss due to the linear filter, in environments that have no significant NTSC co-channel interfering signals. The selection circuit of that invention bypasses the linear filter in the receiver in situations where NTSC co-channel interference is not determined to be a problem and instead processes the received signal using a complementary postcoding filter.

The present invention is concerned with recovery of a field or frame timing signal from the transmitted data segments. The data segments are the same length, each comprising 684 symbols, with 525 data segments corresponding to a transmitted video frame. Each frame further comprises alternating fields of 262 and 263 data segments. Although the data segments and data fields may be transmitted at the NTSC horizontal and vertical rates, respectively, it will be understood that the data segments do not directly correspond to horizontal scanning lines in a television display system. It will also be understood that this frame structure may be modified to incorporate different numbers of symbols per data segment and data segments per frame or field (such as 313 segments per field and 836 symbols per data segment) as disclosed in copending application Ser. No. 175,061, filed Dec. 29, 1993.

One of the data segments in each video field defines a field timing signal that identifies the beginning of the field. The field timing signal, which may occupy only a portion of the data segment, is thus similar in function to the vertical timing signal in a conventional television system. Means are provided in the receiver for recreating a reference data segment that includes a reference field timing signal. This may be accomplished each data segment with a PROM or other suitable memory device, or preferably may be accomplished by developing the digital field reference timing signal on an as-needed basis using, for example, a pseudo-random sequence generator. Each data segment is detected. The portion (or portions) of each data segment that corresponds to the data segment that contains the field timing signal, is compared with the reference field timing signal in the reference data segment. The errors between corresponding symbols in the compared portions of the data segments are accumulated. The data segment in each field that exhibits the least number of symbol errors is assumed to contain the field timing signal and therefore to identify the start of the field and is used to establish the timing relationship for the receiver. A confidence counter is employed to stabilize the identification process. For enhanced stability, the embodiment includes a different field timing signal in each of the two successive fields of data segments. In this embodiment, a field reference generator may recreate the two different reference field timing signals for comparison with the appropriate portions of the alternating fields of data segments.

OBJECTS OF THE INVENTION

A principal object of the invention is to provide a novel field timing signal for a digital television system.

A further object of the invention is to provide a simple arrangement for identifying a field timing signal in a digital television signal.

BRIEF DESCRIPTION OF THE DRAWINGS

These and other objects and advantages of the invention will be apparent upon reading the following description in conjunction with the drawings in which:

FIG. 2 illustrates the various levels for 2/4 level data symbols and 2 level sync symbols;

FIG. 3 illustrates the various levels for 8 level data symbols and 2 level sync symbols;

FIG. 4 illustrates the various levels for 16 level data symbols and 2 level sync symbols.

DESCRIPTION OF THE PREFERRED EMBODIMENT

Figure 1:
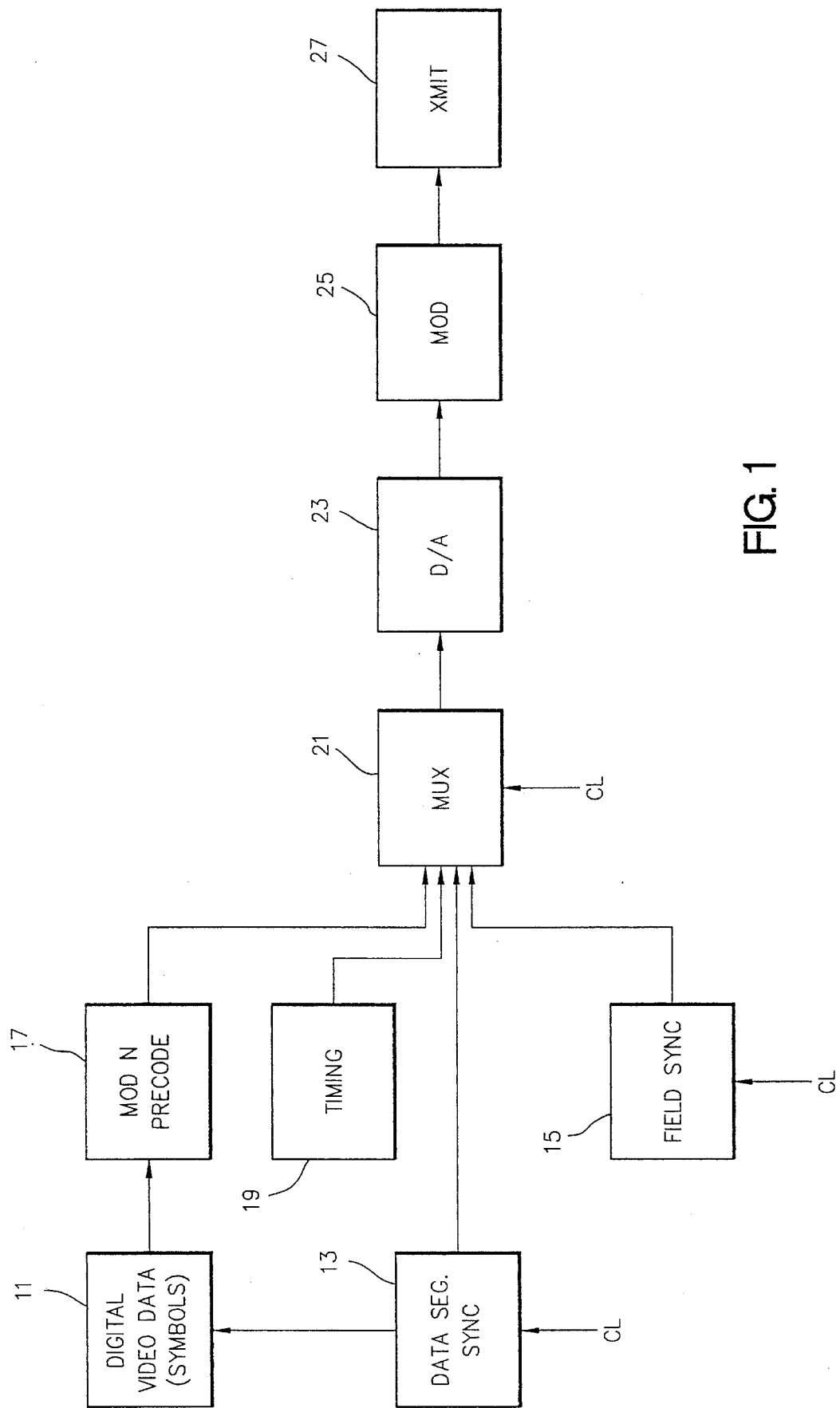
FIG. 1 is a simplified block diagram of a transmitter constructed in accordance with the invention.

In FIG. 1 a transmitter, having a source of digital video data 11 in symbol form, a data segment sync generator 13 and a field sync generator 15, is shown. Data source 11 is coupled to a modulo N precoder 17. It will be understood that precoder 17 may also effect other coding functions. Data segment sync source 13, field sync source 15, precoder 17 and a timing control source 19 are coupled to a multiplexer (MUX) 21. The output of MUX 21 is supplied to a digital-to-analog (D/A) converter 23. D/A 23 feeds a modulator 25 which in turn supplies a signal to a transmission block 27 for transmission. A data clock (not shown) supplies proper timing for the formatting of the data segment sync and the video into groups or fields of successive data segments. The data may be: a) 2 level symbols or 4 level symbols with the data segment sync being 2 level symbols; or b) 2, 4, 8 or 16 level data symbols may be used with the data segment sync being 2 level symbols. The field sync also preferably comprises 2 level symbols although multilevel symbols may also be used. In one embodiment, the four data levels are (a), (b), (c) and (d), with the 2 level data (and data segment sync) comprising levels (a) and (c). In another embodiment, the 2 level symbols for the 2 level data and sync occur at levels intermediate levels (a) and (b) and levels (c) and (d). The field sync uses the same levels as the data segment sync and extends between the outer levels (a) and (d), which makes it robust and therefore easy to detect and noise immune. As shown in FIG. 2, the 2 level sync and 2 level data may also share the same levels (e) and (f) that are intermediate data levels (a) and (b) and data levels (c) and (d), respectively, for the 4 level data.

The preferred system comprises a VSB system having 8 level data symbols for terrestrial broadcasts and 16, 8, 4 or 2 level data symbols for a cable environment. These level arrangements are illustrated in FIGS. 3 and 4, respectively. In both cases the sync symbols (data segment and field) are 2 level and coincide with respective levels of the 8 and 16 level data symbols and are intermediate the outer levels of the data. As illustrated in FIG. 3, the data symbols comprise 8 levels L1–L8 with the sync (both data segment and field timing) corresponding to levels L2 and L7. Similarly in FIG. 4 where the 16 levels are P1–P16, the sync levels (both data segment and field timing) correspond to levels P4 and P13. It will, of course, be appreciated that while these specific levels are preferred, the invention is not to be so limited.

The arrangements have proven satisfactory for good sync recovery and have the benefit of reducing sync power and consequent potential for interference into co-channels for the terrestrial case (VSB=8) and for maximizing the data rate (VSB=16) for the more benign cable environment.

Figure 5:
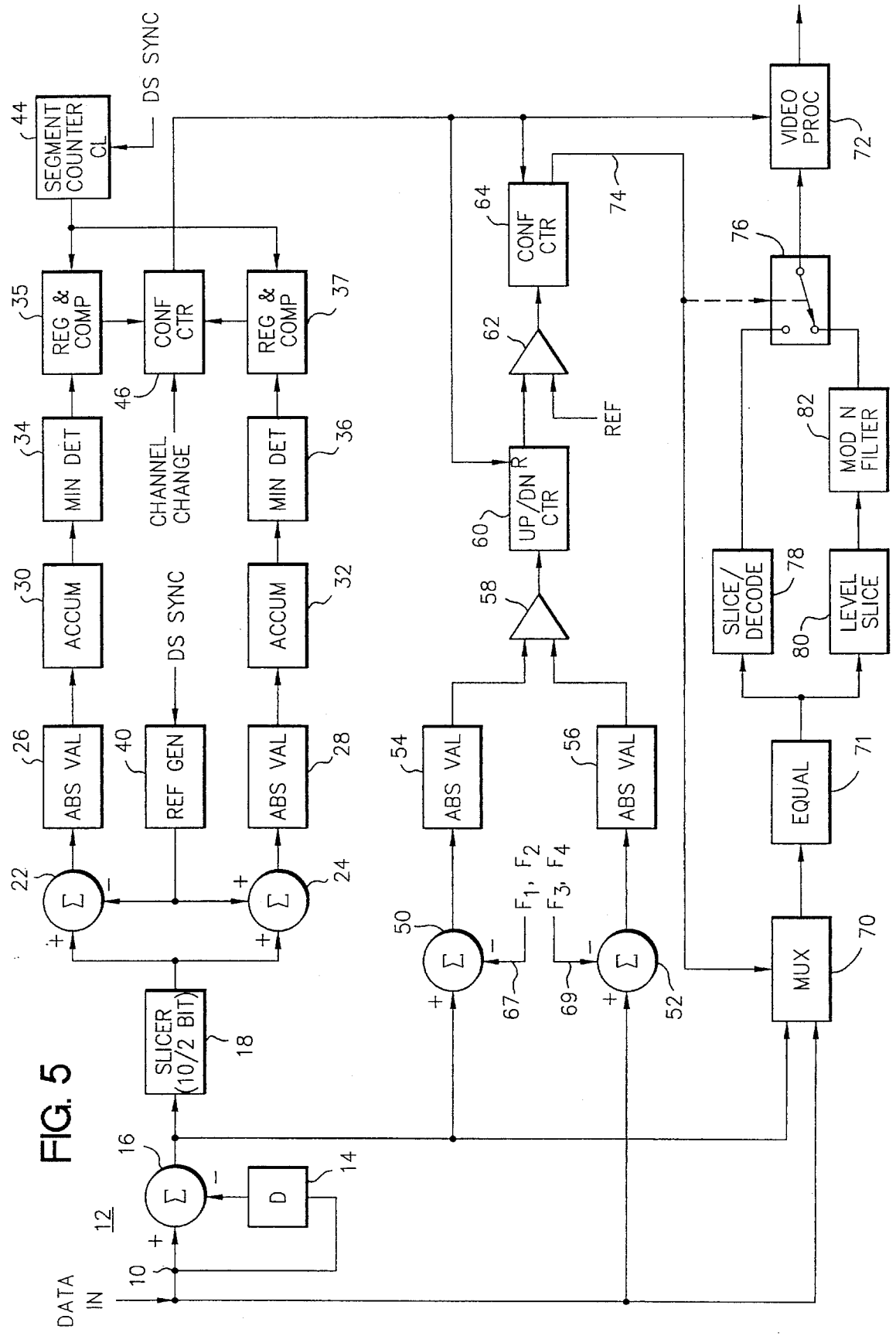
FIG. 5 is a simplified block diagram of a field timing signal determination circuit and a receiver post coder selection circuit.

Referring to FIG. 5, a received digital video data signal is supplied to an input terminal 10. It will be appreciated that different multilevel symbols, may be used and identified (as to type) by suitable header information in the data transmission. In the terrestrial system shown, 8 level data symbols corresponding (FIG. 3) are assumed. It will be appreciated that, while not shown, all of the relevant receiver circuits are supplied with clock timing signals. Consequently, the data segments are locked and the task is to determine which of the data segments is the field timing data segment which includes the field timing signal for denoting the beginning of the associated field. Two field timing data segments, each comprising a field timing signal having 668 pseudo random 2 level symbols, as previously described, are used and the "No. 1" data segment differs from the "No. 263" data segment. For example, the No. 263 data segment may have a polarity that is the reverse of that of the No. 1 data segment. As discussed above, the field timing signal may occupy only a portion of the entire data segment. Those skilled in the art will readily recognize that it is not necessary to identify a field timing data segment in each field, one data segment for each frame being sufficient. However, the redundancy of a field timing data segment in each field enables better, more reliable performance and faster acquisition.

The video data is in the form of precoded modulo N video symbols as specified in U.S. Pat. No. 5,086,340. (The synchronizing signals are seen not to be precoded in the transmitter of FIG. 1.) The input signal includes successive fields of video data, each field containing repetitive data segments of 684 symbols each. Two successive data fields (of 262/263 data segments) are transmitted for each data frame. A data segment sync interval at the beginning of each data segment includes a predetermined data segment sync character preferably comprising four 2 level symbols for establishing data segment timing. As previously mentioned, each of the alternating fields of 262/263 data segments corresponds to one NTSC field although the data segments do not individually correspond to horizontal NTSC lines. A linear post coder circuit 12, configured in a complementary relationship to the transmitter modulo N precoder, comprises a feed forward circuit including a delay 14 and a linear adder 16 with a negative feed forward input. As discussed above, post coder 12 has notches at the NTSC frequencies that have the greatest co-channel interference effects and a notch at DC which precludes any DC that the signal may have acquired from entering the receiver.

It will be noted that linear filter 12 is part of the circuit that determines the field timing signals. This may be preferable for terrestrial broadcasts since the field timing signals must be found, i.e. detected, even in very noisy environments and the presence of NTSC interfering signals can make that task extremely difficult. Obviously, for cable or benign environments, the linear filter is not used. Despite the S/N ratio loss with linear filter 12, its effect in reducing interference makes it highly desirable in the field timing signal recognition circuit. While the use of the two outermost levels of the N level signals would make the field timing signals relatively easy to find, even in noisy environments, the added signal power has more interference causing potential. Preferably, levels intermediate the outermost levels of the multilevel data symbols and coincident with corresponding ones of those levels are used, as shown in FIGS. 3 and 4, for the 2 level data segment and field sync signals.

The output of adder 16 is applied to a slicer 18 where the 10 bit symbols are converted to 2 bit symbols (for terrestrial) and 1 bit symbols (for cable), which simplifies the hardware because the reference field timing signals also need only be 2 bit or 1 bit symbols. The output of slicer 18 is applied to a pair of adders 22 and 24, each of which in turn supplies a respective one of a pair of absolute value circuits 26 and 28. The absolute value circuits 26 and 28 are in turn respectively coupled to error accumulators 30 and 32, each having its output coupled to a respective one of minimum detectors 34 and 36. The outputs of minimum detectors 34 and 36 are respectively coupled to individual register-comparators 35 and 37. The register-comparators 35 and 37 are coupled to a segment counter 44 that is clocked by the data segment sync and determine which of the compared portions of the data segments accumulates the smallest number of symbol errors (when compared with a reference field timing signal) in each respective data field. It will be understood that the entire data segment need not be compared; only the portion that would be occupied by the field timing signal is compared to the reference field timing signal. The outputs of the register-comparators 35 and 37 are applied to a confidence counter 46 that supplies the number of the data segment that exhibits the smallest number of errors from the comparison and which is determined to contain the field timing signal. The other inputs of adders 22 and 24 are supplied with reference field timing signals from a reference generator 40. These reference field timing signals correspond to the 3-level (resultant) field timing signals in the respective No. 1 and No. 263 data segments in each of the data fields as developed by linear filter 12 and slicer 18. It will be appreciated that the field timing data segments are not precoded (see FIG. 1) and are 2 level symbols. These 2 level symbols are however converted into 3 levels when passed through linear filter 12. The reference field timing signals, one for each field of a frame, are created in reference generator 40 and are outputted by the data segment sync which is developed in accordance with the teachings of Ser. No. 894,388 above. It will be observed that the received signal must be locked by the data segment sync in order to identify the field timing signals.

While the errors between the compared portions of each data segment and the reference field timing signal are noted for each data segment, it will be appreciated that "agreements" or "non agreements" between compared symbols may be used with equal facility. The presence of slicer 18 makes this approach preferable from an implementation viewpoint. Suitable changes in circuitry should be obvious to those skilled in the art to test for agreements/non agreements rather than errors and the invention should not be limited to counting errors.

In the preferred embodiment of the invention, the field timing signal in the No. 263 data segment has a polarity opposite to the field timing signal in the No. 1 data segment. Thus a common reference field timing signal may be applied to both adders 22 and 24 with adder 22 detecting the No. 1 data segment (assuming its field timing signal has a positive polarity) since it is configured in a subtractive sense and adder 24 testing the No. 263 data segment since it is configured in an additive sense. While preferred, the use of identical, but opposite polarity reference field timing signals is also not to be considered limiting of the invention.

The video data at terminal 10 is also applied directly to one input of a MUX 70 and through linear filter 12 to the other input of MUX 70. In accordance with the invention claimed in copending application Ser. No. 893,486, a switching signal selects which of the input data signals (unfiltered or linear filtered) is coupled by MUX 70 to video processor 72 for further processing. The switching signal selection circuitry includes an adder 50, to which is applied the signal from linear filter 12, and an adder 52, to which is applied the signal from input terminal 10, both adders being configured in a subtractive sense. Adder 50 is supplied at its negative input with two reference field timing input signals F1, F2 on lead 67 and adder 52 is similarly supplied with reference field timing signals F3, F4 on lead 69. The reference signals F1 and F2 represent the alternate field timing signals (as received from linear filter 12) whereas the reference signals F3 and F4 similarly correspond to the field timing signals received directly from input terminal 10. The outputs of adders 50 and 52 represent the difference or error between corresponding symbols in the input field timing signals and the reference field timing signals, and are supplied to absolute value circuits 54 and 56, respectively. The absolute value of the errors are coupled to a comparator 58 whose output goes high when the error produced by circuit 56 exceeds the error produced by circuit 54 and goes low when the error produced by circuit 56 is less than the error produced by circuit 54. The output of comparator 58 supplies an UP/DN counter 60, which counts up in response to one output from comparator 58 and counts down in response to the opposite output.

The field sync from confidence counter 46 is supplied to the reset terminal of UP/DN counter 60 and to an enable input of a confidence counter 64. The UP/DN counter 60 output is compared with a fixed reference number in a comparator 62. The output of comparator 62, which is high or low based upon the relationship between the count of counter 60 and the fixed reference number, is supplied to confidence counter 64 which develops a switching signal on a lead 74 for switching MUX 70 and operating another switch 76. Confidence counter 64, by having its enable input supplied with field sync, is enabled at the end of the appropriate data segments to respond to the output of comparator 58. If the count in counter 60 is above the reference number at the end of the field timing signal data segment, confidence counter 64 counts in one direction. If it is not, confidence counter 64 counts in the other direction. The "bias" is toward selection of the non post coder path and the reference number establishes the number of errors that are tolerated before switching to the post coder path (through filter 12).

The output of MUX 70 supplies an equalizer 71 that is incorporated prior to decoding of the signal to help correct for various distortions, such as ghosts and channel tilt. Equalizer 71 supplies a slicer/decoder 78 and a level slicer 80. Slicer/decoder 78 is coupled to one terminal of switch 76 and slicer 80 is coupled to another terminal of switch 76 through a modulo N filter 82 which comprises the complement of the transmitter modulo N precoding filter. The symbol levels required to be processed by slicer/decoder 78 depends upon the levels selected for the data, field sync and data segment sync. In a system using 2 level syncs [levels (e) and (f)] and 2 or 4 level data [any of levels (a)–(f)] of FIG. 2, slicer/decoder 78 would be capable of reconverting the 13 levels of the linear filtered signal to the original 2 and 4 level signals. Similarly slicer 80 would be configured to properly slice the precoded 2 or 4 level data and non precoded 2 level syncs. For the preferred arrangement of FIG. 3, slicer/decoder 78 would be configured to reconvert the levels of the linear filtered data and slicer 80 to slice the non linear filtered precoded 8 level data symbols and 2 level syncs. Thus, the video data is applied through slicer 80 and filter 82 when NTSC co-channel interference is not a significant problem and otherwise it is applied through slicer/decoder 78.

To recapitulate, the switching circuit selects either the input signal at data input terminal 10 or the input signal as processed by linear post coder filter 12, for processing in the receiver. The determination is made by comparing the field timing signals (which are not precoded) with suitable reference field timing signals and selecting the path that displays the least number of errors. The reference field timing signals F1 and F2 are the same as those generated by reference generator 40 and are switched in accordance with the field that is being received. The reference field timing signals F3 and F4 differ because the effect of linear filter 12 is not present at input terminal 10. The circuit is locked to the output of the field timing signal recognition circuit described above and compares each symbol in the stored reference field timing signal with the corresponding symbols in the field timing signal data segments, as passed directly and as processed by the linear filter (post coder) 12. The absolute values of the errors are compared since the sign or polarity of an error is immaterial. The determination as to whether the signal in the direct path exhibits a sufficiently lesser or greater number of errors than the signal as processed by the linear filter 12 is established by the reference number applied to the comparator 62. The field timing signal (sync) at the reset terminal of counter 60 enables counter 60 to respond to the output of comparator 58 when the reference field timing signals are being compared with the field timing signals. The confidence counter 64 stabilizes the determination of the error detection circuitry and develops the switching signal for MUX 70 and switch 76 for selecting the signal processing path that produces the "least" number of errors. It should be apparent from the above discussion that the term "least" used herein is relative and really denotes the number of errors to be tolerated before a switchover to the post coder path is made. Thus if the incoming video data is subjected to NTSC co-channel interference, the processing path that includes linear filter 12 (which removes the majority of the NTSC co-channel interference) will produce significantly fewer errors than the direct signal processing path and, depending upon the reference number selected, MUX 70 and switch 76 will be switched to select the path through linear filter 12 and slicer/decoder 78 for supplying the signal to video processor 72. On the other hand, if the incoming video data is not subjected to significant NTSC co-channel interference, MUX 70 and switch 76 select the path from input terminal 10 through level slicer 80 and modulo 4 filter 82 for supplying the signal to video processor 72.

Referring back to the identification circuit of the invention, confidence counter 46 develops a field sync signal that indicates occurrence of the No. 1 and No. 263 data segments which mark the beginning of the associated fields. This output is used to synchronize the video processing circuit 72. The confidence counter counts up from zero to a maximum when the data segment with the smallest number of field timing signal symbol errors matches the previous data segment having the smallest number of field timing signal symbol errors and counts down when a different data segment exhibits the smaller number of symbol errors.

The rate of counting up may advantageously be made different from the rate of counting down to favor the locked condition. These design considerations are determined by signal conditions and empirical data to avoid abrupt changes in synchronization. A channel change input is provided for resetting confidence counter 16 to zero immediately after a change in channel occurs.

Thus, it will be seen that the invention provides for ready recognition of the field/frame timing signals based upon comparison with reference field timing signals recreated in the receiver.

It will be appreciated that the particular techniques disclosed for identifying the field timing signal and selecting the alternate paths are interchangeable. Thus, the technique for comparing symbol errors may readily be substituted for the technique for accumulating errors in a data segment. Additionally, other error determination schemes may be employed with equal facility.

What is claimed is:

1. A method of operating a digital data transmission system comprising:

formatting digital data in the form of multilevel symbols in successive fields, each field comprising a fixed number of equal length repetitive data segments and a field segment of the same length;

providing fixed length segment sync information for each data and field segment;

providing field sync information, longer than said fixed length, in said field segment; and transmitting the formatted fields of digital data.

2. The method of claim 1 including providing said digital data in the form of M-level data symbols and said sync information in the form of N-level sync symbols, wherein M is greater N.

3. The method of claim 2 wherein N is equal to 2.

4. The method of claim 2 including:
providing said segment sync information in the form of four 2-level symbols for each of said data segments; and
providing said field sync information as a significantly larger number of 2-level symbols.

5. The method of claim 4 including providing said field sync infromation in the form of alternating different reference data segments F1 and F2.

6. A method of operating a digital data reception system for receiving digital data in the form of multilevel symbols formatted in groups of successive fields, each field comprising a fixed number of repetitive equal length data segments and a field segment of the same length with each data and field segment being provided with a fixed length segment sync signal and each field segment being provided with a field sync signal longer than said fixed length comprising:
receiving the transmitted formatted fields of digital data;
recovering said segment sync signal from said received formatted digital data;
recovering said field sync signal from said received data; and
using said recovered segment sync signal and field sync signal to process said received formatted digital data.

7. The method of claim 6 wherein said digital data is provided in the form of M-level data symbols and said sync information in the form of N-level sync symbols, wherein M is greater than N.

8. The method of claim 7 wherein N is equal to 2.

9. The method of claim 7 wherein said data segment sync information is provided in the form of a predetermined number of said N-level sync symbols for each of said data segments.

10. The method of claim 9 wherein said field sync signal is provided in the form of alternating different reference data segments F1 and F2.

11. A digital system for conveying video information and other digital data comprising:
a stream of multilevel symbols formatted in successive fields with each field including a number of repetitive equal length data segments and a field segment of the same length;
segment sync information comprising a fixed number of symbols at the beginning of each of said data and field segments; and
field sync information comprising a number of multilevel symbols, greater than said fixed number included in said field segment.

12. The system of claim 11 wherein said field sync information comprises alternating sequences F1 and F2 of multilevel symbols included in successive ones of said field segments.

13. The system of claim 12 wherein said digital data comprises M-level data symbols and said sync information comprises N-level sync symbols, wherein M is greater than N.

14. A signal format for conveying video information and other data in the form of M-level data symbols comprising:

a plurality of fields of M-level data symbols, each field comprising a fixed number of equal length data segments and a field segment of the same length;

a fixed number of N-level symbols at the beginning of each said data segment and said field segment comprising a segment sync character; and alternating sequences F1 and F2 of N-level symbols comprising field sync information included in said field segment of successive fields, wherein M is greater than N and said sequences F1 and F2 each comprise a number of symbols greater than said fixed number.

15. The signal format of claim 14 wherein N is equal to 2.

16. A method of operating a digital data system comprising:
formatting digital data in the form of multilevel symbols in groups of successive fields, each field including a number of equal length data segments and a field segment of the same length;
providing fixed length segment sync information, in the form of multilevel symbols, in each data and field segment;
providing field sync information, in the form of multilevel symbols, in said field segments which alternate between two different values in successive fields and where said field sync information is of a greater length than said segment sync information;
transmitting said formatted digital data;
receiving and recovering said segment sync and said field sync information from said formatted digital data; and
using said segment sync and said field sync information for recovering said digital data.

17. The method of claim 16 including providing said digital data in the form of M-level data symbols and said sync information in the form of N-level sync symbols, wherein M is greater than N.

18. The method of claim 17 wherein N is equal to 2.

19. The method of claim 17 including providing said segment sync information in the form of a predetermined number of said N-level sync symbols for each of said data segments and providing said field sync information as a sequence of N-level symbols greater than said predetermined number.

20. The method of claim 19 including providing said field sync information in the form of alternating different reference data segments F1 and F2.

21. The method of claim 1 wherein said field sync information is provided in the form of alternating different reference data segments F1 and F2 in successive fields.

22. The method of claim 2 wherein said N-level symbols are intermediate selected ones of said M-level symbols.

23. The method of claim 7 wherein said N-level symbols are intermediate selected ones of said M-level symbols.

24. The system of claim 13 wherein said N-level symbols are intermediate selected ones of said M-level symbols.

25. The signal format of claim 14 wherein said alternating sequences of N-level symbols are significantly longer than said fixed number of N-level symbols.

26. The signal format of claim 14 wherein said N-level symbols are intermediate selected ones of said M-level symbols.

* * * * *

UNITED STATES PATENT AND TRADEMARK OFFICE
CERTIFICATE OF CORRECTION

PATENT NO. : 5,534,938
DATED : July 9, 1996
INVENTOR(S) : Richard W. Citta, Gary J. Sgrignoli, Rudolf Turner It is certified that error appears in the above-identified patent and that said Letters Patent is hereby corrected as shown below:

In Claim 2, Column 9, Line 2: Insert - than - after "greater".

Signed and Sealed this

First Day of October, 1996

Attest:

BRUCE LEHMAN

Attesting Officer     Commissioner of Patents and Trademarks